July 29, 1924.
J. A. LEWELLYN
COIL WINDING MACHINE
Filed April 28, 1919
1,503,272
6 Sheets-Sheet 1
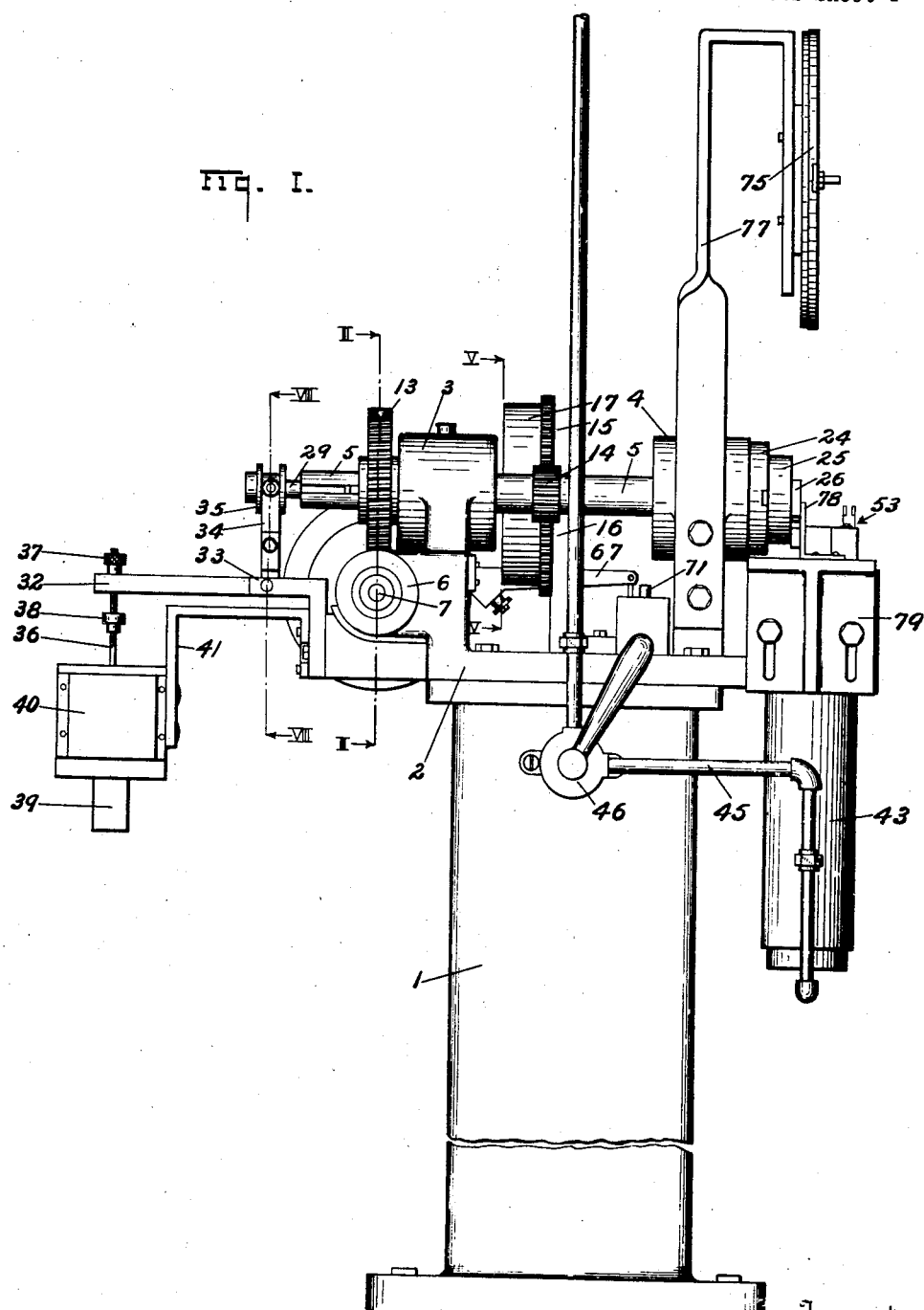
Fig. I.
Inventor
John A. Lewellyn
By Chester H. Braselton
Attorney July 29, 1924.  1,503,272
J. A. LEWELLYN
COIL WINDING MACHINE
Filed April 28, 1919  6 Sheets-Sheet 2
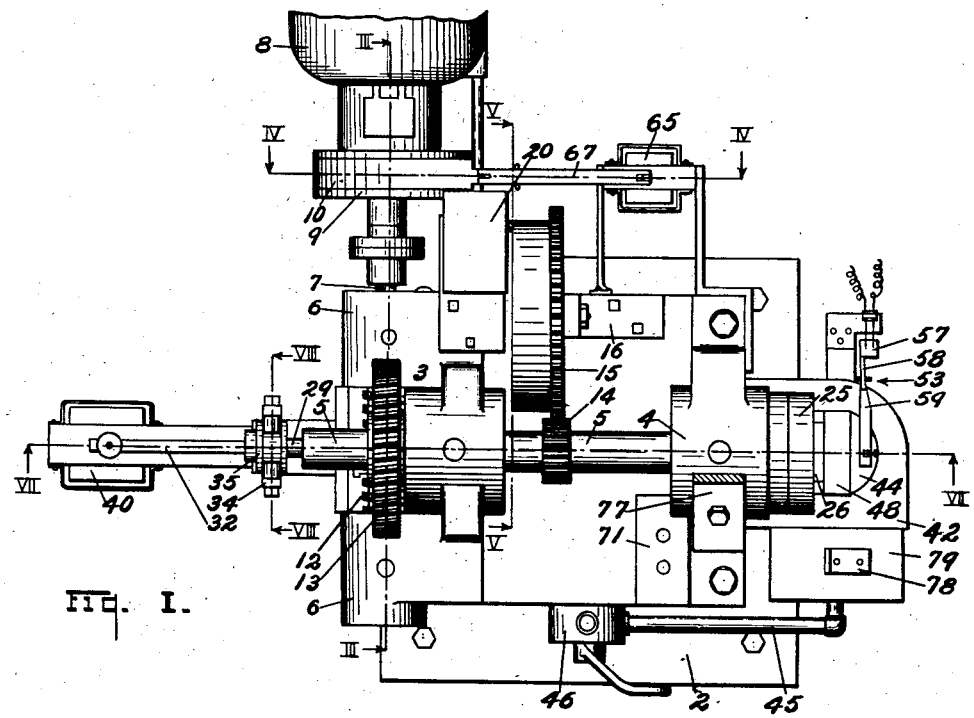
Fig. I.
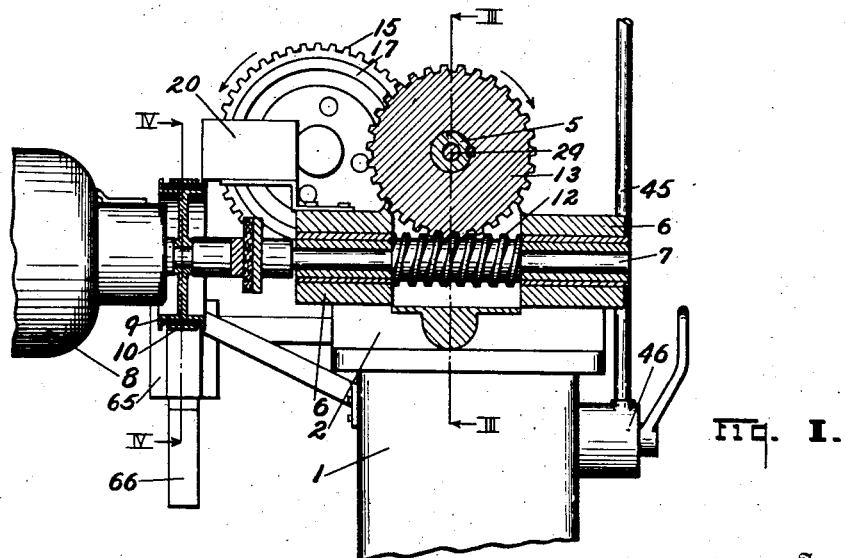
Fig. I.
Inventor
John A. Lewellyn
By Chester H. Braselton
Attorney July 29, 1924.
J. A. LEWELLYN
COIL WINDING MACHINE
Filed April 28, 1919
1,503,272
6 Sheets-Sheet 3
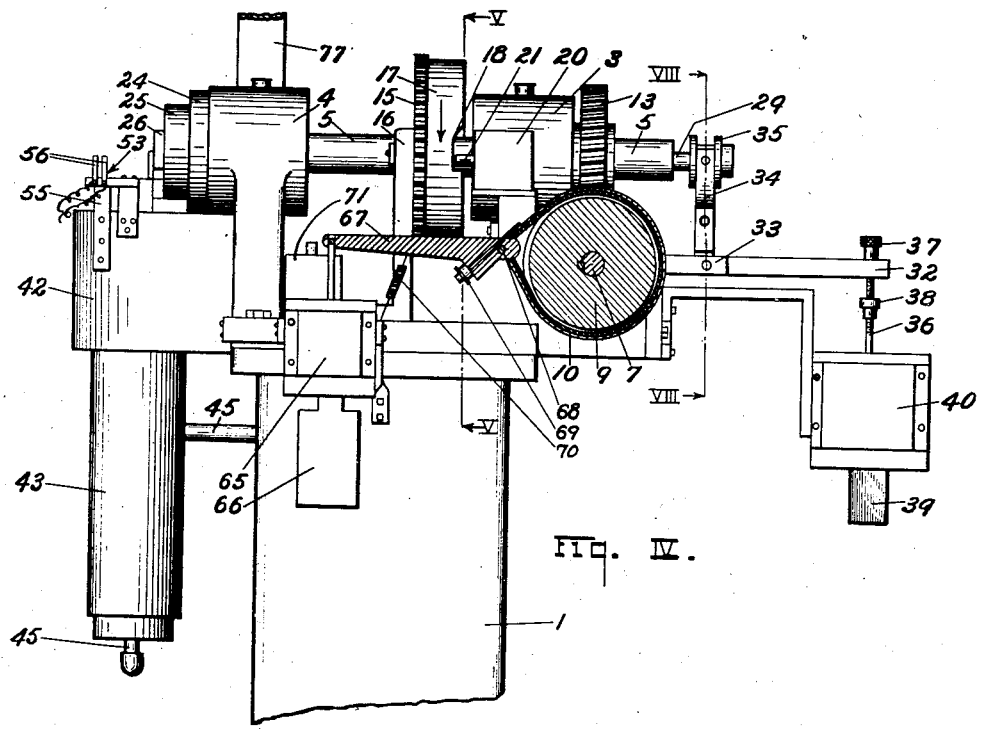
Fig. IV.
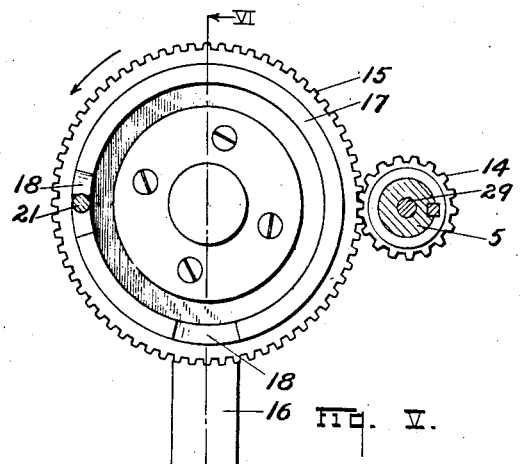
Fig. V.
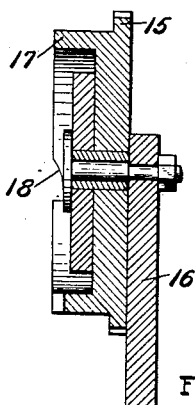
Fig. VI.
Inventor
John A. Lewellyn
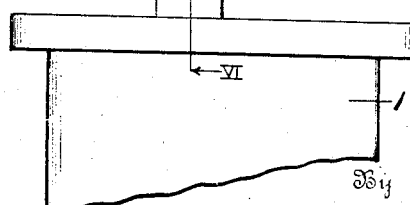
Attorney July 29, 1924.
J. A. LEWELLYN
1,503,272
COIL WINDING MACHINE
Filed April 28, 1919
6 Sheets-Sheet 4
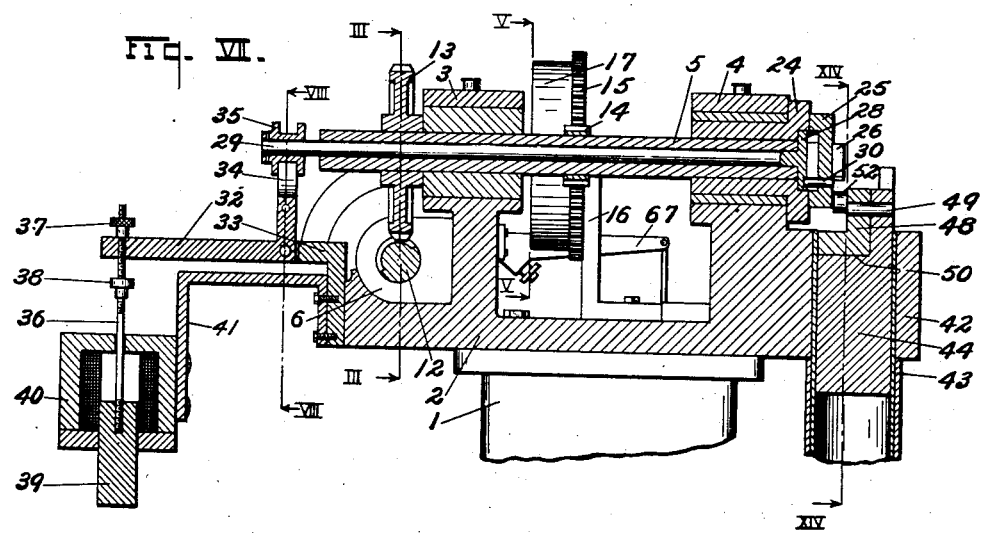
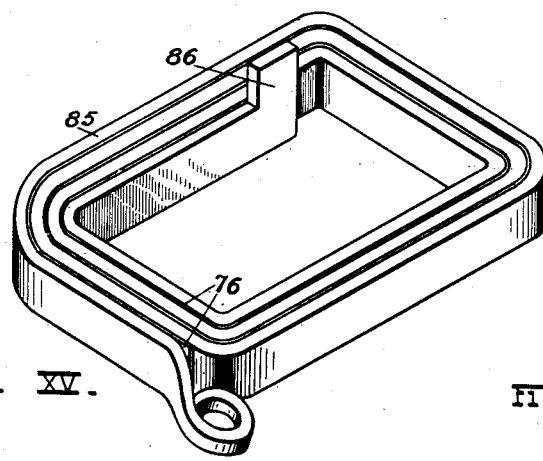
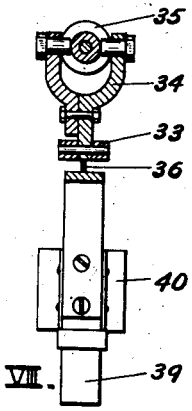
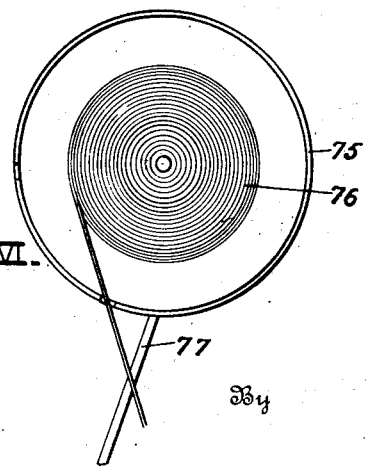
Inventor
John A. Lewellyn
By Chester H. Braselton
Attorney

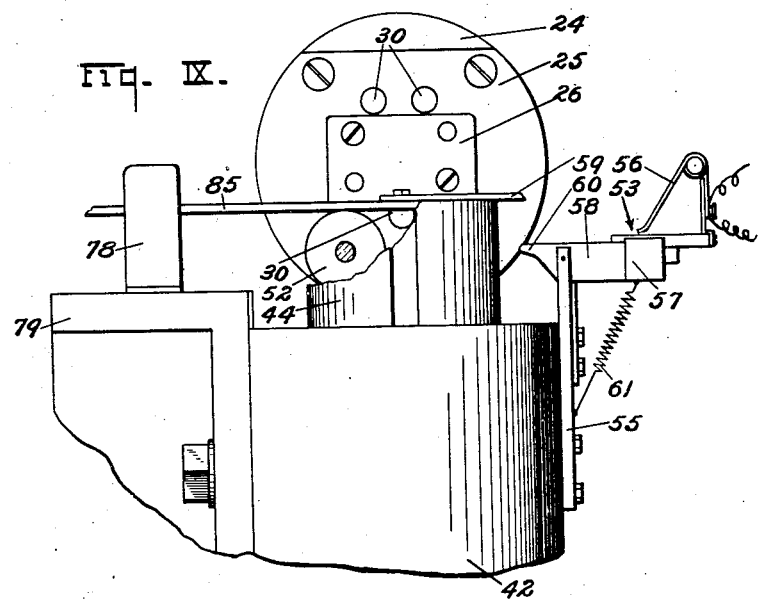
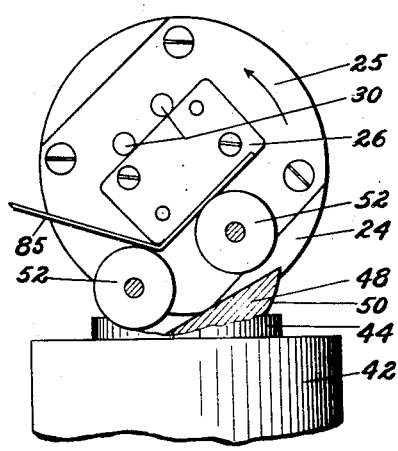
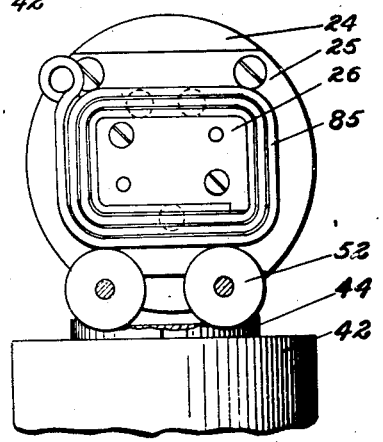
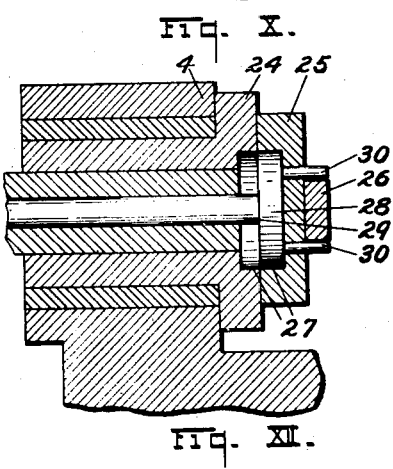
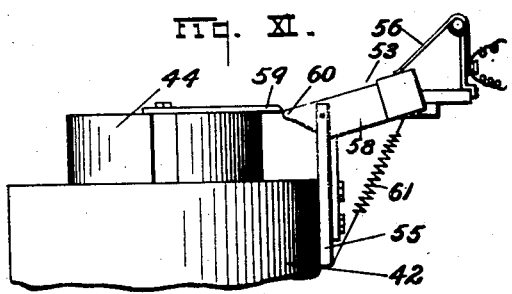
Inventor
John A. Lewellyn
By Chester H. Braselton
Attorney

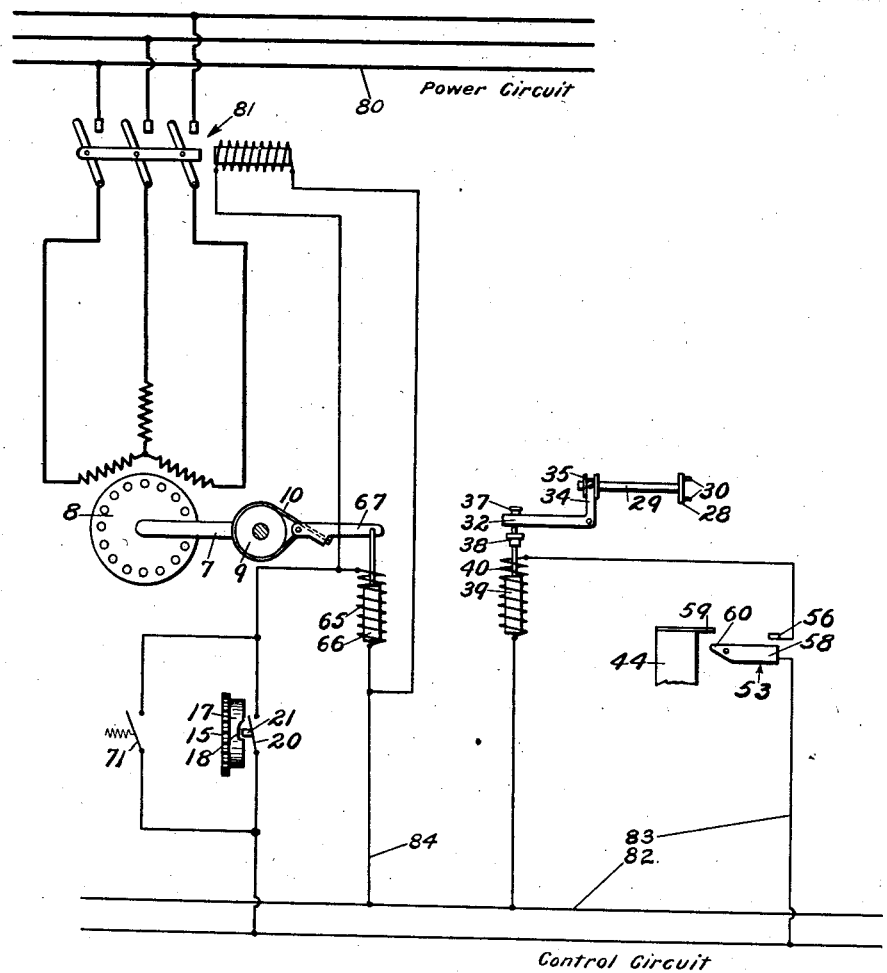
Fig. XVII.

Patented July 29, 1924.

1,503,272

UNITED STATES PATENT OFFICE.

JOHN A. LEWELLYN, OF TOLEDO, OHIO, ASSIGNOR, BY MESNE ASSIGNMENTS, TO THE ELECTRIC AUTO-LITE COMPANY, OF TOLEDO, OHIO, A CORPORATION OF OHIO.

COIL-WINDING MACHINE.

Application filed April 28, 1919. Serial No. 293,269.

*To all whom it may concern:*

Be it known that I, JOHN A. LEWELLYN, a citizen of the United States, residing at Toledo, in the county of Lucas and State of Ohio, have invented certain new and useful Improvements in Coil-Winding Machines, of which I declare the following to be a full, clear, and exact description.

This invention relates to machines for winding coils for dynamo-electric machines.

An object of this invention is the construction of a machine which will wind coils suitable for dynamo-electric machines.

Another object is the construction of such a machine into which wire or ribbon may be fed and after a given number of turns have been wound the machine will be automatically stopped.

A further object of this invention is the provision, in a machine for winding coils, of means for ejecting the wound coil.

Further objects of this invention relate to economies of manufacture and details of construction as will herein after appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be preferred, is illustrated in the accompanying drawings forming a part thereof in which:

Figure I is a front view of the complete machine.

Figure II is a top plan view of the same.

Figure III is a sectional view on line III—III of Figure I.

Figure IV is a sectional view on line IV—IV of Figure II looking from the rear.

Figure V is a sectional view on line V—V of Figures I, II and IV.

Figure VI is a sectional view on line VI—VI of Figure V.

Figure VII is a sectional view on line VII—VII of Figure II.

Figure VIII is a sectional view on line VIII—VIII of Figures I, II and VII.

Figure IX is an enlarged detail view of the right hand end of the machine as viewed in Figure I showing the rotating form upon which the wire is wound and the pneumatic means for engaging the wire as it is wound, a part thereof being broken away.

Figure X is a view similar to Figure IX but showing the form advanced a quarter turn and also showing both pressure rollers.

Figure XI is a view similar to Figure X showing the coil completed.

Figure XII is a sectional view corresponding to Figure VII but showing on a larger scale one main bearing only with the adjacent winding form and coil ejecting means.

Figure XIII is a view similar to Figure IX but showing the pneumatic plunger in a lowered portion and the switch controlled thereby closed.

Figure XIV is a sectional view on line XIV—XIV of Figure VII.

Figure XV is a perspective view of a completed coil.

Figure XVI is a side view of the reel of fish paper which is simultaneously wound with the wire.

Figure XVII is a circuit diagram showing the electrical connections.

Similar reference numerals refer to similar parts throughout the several views and the cross sectional views are taken looking in the direction of the small arrows.

This machine comprises a pedestal 1 carrying a frame 2 having bearings 3, 4 for a shaft 5 and bearings 6, 6 for a driving shaft 7. The shaft 7 is adapted to be driven directly by an electric motor 8 carrying a brake drum 9 against which bears a brake strap 10. The shaft 7 carries a worm 12 between the two bearings 6, 6 which worm meshes with a worm wheel 13 secured to shaft 5. Shaft 5 also has secured to it a pinion 14 which meshes with a gear wheel 15 mounted upon frame 2 by means of a bracket 16. The gear wheel 15 has a side flange constituting a cam 17 which cam has, in this instance, two notches 18. An electric switch 20 having an outwardly spring pressed push button 21 is mounted along side of the gear wheel 15 so that the push button will engage the cam 17.

The shaft 5 has secured to it a member 24 comprising a head and a sleeve which latter constitutes a journal for this end of the shaft. Secured to the face of this member 24 by means of screws is a plate 25 to which is attached in the same manner a form 26 upon which a wire or ribbon is adapted to be wound to form a coil. Members 24 and 25 have alined circular openings 27 in which operates a plunger 28 secured to the end of a rod 29 extending through the shaft 5 and projecting beyond the end thereof. The plunger 28 carries three pins 30 which are adapted to slide through the plate 25 and are located close to the form 26 the arrangement being such as shown in Figures IX, X and XI. The function of these pins is to eject or expel the coil from the form when the winding operation has been completed. A bell-crank lever 32 suitably mounted upon the frame 2 by means of a bracket 33 has one arm provided with a shifting fork 34 for engaging a thrust collar 35 secured to the rod 29 and has its other arm connected by means of a rod 36 carrying adjusting screws 37 and 38 with the plunger 39 of the electro-magnet 40, mounted on the frame by a bracket 41.

This electro-magnet 40 as will be seen from Figure VII is so constructed that the weight of the plunger 39 normally holds the pins 30 in a retracted position.

Into an extension 42 of the frame 2 there is fitted a pneumatic cylinder 43 which has a piston 44 and which is connected by suitable piping 45 to an air pressure reservoir not shown, the flow of air to and from the cylinder being controlled by a valve 46. The upper portion of the piston 44 is cut away in the manner shown in Figures VII and XIV to receive a member 48. This member 48 is pivotally secured to the piston 44 by means of a pivot pin 49 and further is provided with a cylindrical bearing surface 50 concentric with the axis of the pivot pin 49. The piston 44 is provided with a like cylindrical surface the purpose of which is to provide an extended bearing surface for the member 48. The member 48 carries at its upper portion two hardened steel rollers 52 which are located below and in alinement with the form upon which the wire or ribbon is wound. These rollers bend the wire or ribbon around the form as it is rotated and by reason of the pivotal mounting just described they are able to follow the conformation of the form 26 and at all times exert a substantially uniform pressure upon the wire or ribbon as it is wound.

A switch device 53 for controlling the circuit of the electro-magnet 40 is mounted upon the frame 2 by means of a bracket 55 and comprises a pair of springs 56 and a contact member 57 carried by the member 58 which is pivoted to the bracket 55. A plate 59 mounted upon the top of the piston 44 is arranged to engage the end 60 of the contact carrying member 58 tilting the same to electrically connect the two springs 56 as the piston descends. This position is illustrated by Figure XIII. Upon further downward movement of the piston the plate slips off the end 60 permitting the spring 61 to restore the member 58 to its normal horizontal position and open the circuit. Upward movement of the piston merely compresses the spring 61 without affecting the circuit.

An electro-magnet 65 similar to magnet 40 shown in Figure VII whose plunger 66 is connected to a lever 67 operates the brake strap 10 and is controlled by the switch 20 which also controls the motor switch 81 shown diagrammatically only in Figure XVII.

This lever 67 is pivoted to the frame at 68 and has attached to it both ends of the brake strap 10, one end being adjustably attached by means of a nut 69. A tension spring 70 connecting the lever 67 with the frame assists in holding the brake applied when the magnet 65 is de-energized. By means of the adjusting nut 69 the tension of the brake strap may be suitably varied so that the motor may run freely when the magnet 65 is energized but will be quickly brought to rest when the magnet is de-energized.

A manually operable switch 71, located on the frame 2 in a position convenient to the operator, is connected across the terminals of the cam operated switch 20 to close the circuit controlling the motor and brake when the switch 20 is open.

A reel 75 carrying suitable insulating material 76 such, for example, as fish paper is rotatably mounted upon a bracket 77 secured to the frame. A guide 78 attached to an adjustable bracket 79 serves to cause the wire or ribbon to be wound straight upon the form and to prevent it from working off during the winding operation.

Referring to the circuit diagram, Figure XVII, there is shown the motor 8, in this case a three phase induction motor, connected to the three phase power circuit 80 by means of an electro-magnetically operated switch 81 shown diagrammatically only.

A control circuit 82 energized by any suitable source has a branch 83 including in series the switch 53 and the electro-magnet 40 for ejecting the coil. Another branch circuit 84 includes the cam operated switch 20 and the manual switch 71 in parallel each of which is adapted to control the motor switch 81 and the brake releasing magnet 65 for simultaneous operation.

The construction and operation of the machine may be better understood by a brief description of the manner of using it in the actual winding of a coil. With the parts in the positions shown by Figures I and II, a length of wire or ribbon 85 having one end 86 previously bent up at right angles as by a punch press in the manner shown in Figure XV is inserted with the bent up end engaged in a correspondingly shaped opening in the plate 25 not shown in the drawing. The valve 46 is now turned to admit air pressure to the cylinder 43 thereby bringing the two rollers into firm contact with the wire or ribbon 85, this stage of the operation being illustrated by Figure IX. Switch 71 is now operated and as shown in Figure XVII closes a shunt circuit around the switch 20 thereby operating the switch 81 to start the motor and energizing the electro-magnet 65 to release the brake on the motor shaft. This switch 71 need be closed only long enough to enable the push button 21 of switch 20 to ride out of the notch 18 after which the circuit is automatically held closed until the push button falls into the same or another notch.

At the beginning of the winding operation and before the form has made one complete turn the end of the insulation strip of fish paper is inserted between the wire or ribbon and the form so as to be concurrently wound thereon.

As the form rotates the rollers tightly press the wire or ribbon together with the fish paper against the form, both rollers at all times engaging the coil with a uniform pressure and the pivotal mounting of the member 48 permitting them to follow the contour of the form.

The cam 17 is so constructed that when the form has made the desired number of turns for a complete coil a notch 18 will have come to a position to release the push button 21 of switch 20 thereby opening the circuit controlling the motor and the brake, further movement of the form being then quickly arrested. The operator now turns the valve 46 to release position cutting off the air supply to the cylinder and permitting the air in the cylinder to be exhausted. The piston 44 accordingly descends withdrawing the rollers from the coil and when the piston reaches a certain point in its downward movement the switch 53 is operated to energize the magnet 40 to eject the coil from the form on which it was wound. Further downward movement of the piston releases the switch 53 whereupon the plunger 38 descends by gravity and withdraws the coil-ejecting pins 30. The machine is now ready for a repetition of the operation just described.

If the gear ratio between the pinion 14 and gear 15 is such that while the form is making the desired number of rotations the gear makes one complete rotation the cam 17 may be provided with a single notch 18. However, when such is not true, the cam may be provided with two notches as shown in Figures V and VI separated by an angle corresponding to the desired angular movement of the form. In the use of a machine so constructed, after a coil has been wound, the switch 70 will be operated to again initiate movement of the parts the cam 17 subsequently closing the motor control circuit and holding it closed until the second notch 18 is reached when the motor is again stopped and the parts are in position for the winding of another coil.

While I have described my invention in more or less detail and as being embodied in certain precise forms, I do not desire or intend to be limited thereto as on the contrary my invention contemplates broadly all proper changes, as well as the omission of immaterial elements and the substitution of equivalents therefor as circumstances may suggest or necessity render expedient.

Having thus described my invention, what I claim as new and desire to secure by Letters Patent, is:

1. In a coil winding machine, the combination of a rotatable form, means for rotating said form for winding a conductor thereon, a pair of rollers arranged one behind the other for engaging said conductor at all times as it is wound upon the form and means for yieldingly pressing said rollers against said conductor and permitting each to follow the conformation of said form.

2. In a coil winding machine having a form upon which a conductor is adapted to be wound, driving means for rotating said form, a circuit for controlling said driving means, a switch in said circuit, a cam in operative connection with said form for actuating said switch, a normally applied brake for said driving means, means connected to said circuit for relieving said brake and a manually operable switch connected in shunt to said switch.

3. In a coil winding machine, a rotatable form upon which a conductor is adapted to be wound, a device for pressing the conductor against the form, a switch adapted to be operated upon the withdrawal of said device, and electro-magnetic means for ejecting the wound conductor from the form controlled by said switch.

4. In a coil winding machine having a rotatable form upon which a conductor is adapted to be wound, a member mounted to move toward and away from said form, a second member mounted on said first member to swing in a plane at right angles to the axis of rotation of said form and means carried by said second member for engaging the conductor as it is wound upon the form.

5. In a coil winding machine having a rotatable form upon which a conductor is adapted to be wound, a pneumatically operated member, a second member mounted thereon to rock in a plane perpendicular to the axis of said rotatable form and a pair of rollers carried by said second member for engaging the conductor as it is wound upon said form whereby each of said rollers may follow the contour of the conductor as it is wound upon the form and exert there against a substantially uniform pressure.

6. In a coil winding machine having a rotatable form upon which a conductor is adapted to be wound, a member mounted to move at right angles to the axis of rotation of said form, a second member mounted on said first member to rock in the plane of rotation of said form and a pair of rollers pivoted to said last member, each adapted to engage at all times the conductor as it is wound on said form.

7. In a coil winding machine, a rotatable form upon which a conductor is adapted to be wound, a device comprising a sliding member having a pair of rollers for yieldingly pressing the conductor against said form, means for moving said member out of contact with said conductor, mechanism rotatable with said form for ejecting the wound conductor therefrom, and electromagnetic means for operating said ejecting mechanism rendered operative by a predetermined movement of said member.

8. In a coil winding machine, a rotatably mounted form upon which a conductor is adapted to be wound, a device comprising a plurality of pins rotatable with said form for ejecting the wound conductor from said form, a cylinder, a plunger therein, means for admitting air to and withdrawing air from said cylinder, a rocking member carried by said plunger having a pair of rollers pressing said conductor against said form as it is wound, an electromagnet for operating said device, a switch for controlling said electromagnet and means for operating said switch automatically when air is withdrawn from said cylinder and said plunger reaches a predetermined point in its movement.

9. In a coil winding machine having a rotatable form upon which a conductor is adapted to be wound, driving means for rotating said form, a normally applied brake for said driving means, electromagnetic means for controlling said brake, an electromagnetic switch for controlling said driving means, a switch operatively connected to said form and circuit connections between said last switch and said electromagnetic devices whereby at a predetermined point in the movement of said form said electromagnetic switch opens and said brake is applied to stop further movement of the form.

In testimony whereof, I affix my signature.

JOHN A. LEWELLYN.